A. TURNBULL & F. N. FROST.
Lawn-Mower.

No. 168,810. Patented Oct. 11, 1875.

Witnesses:
W. M. Churchill
S. H. Wood

Andrew Turnbull
Francis N. Frost
Inventors

UNITED STATES PATENT OFFICE.

ANDREW TURNBULL AND FRANCIS N. FROST, OF NEW BRITAIN, ASSIGNORS TO FRANKLIN ROYS, OF EAST BERLIN, CONNECTICUT.

IMPROVEMENT IN LAWN-MOWERS.

Specification forming part of Letters Patent No. 168,810, dated October 11, 1875; application filed January 9, 1874.

*To all whom it may concern:*

Be it known that we, A. TURNBULL and F. N. FROST, of New Britain, county of Hartford and State of Connecticut, have invented certain new and useful Improvements in Lawn-Mowers, of which the following is a specification:

Our invention relates to that class of lawn-mowers in which a large cylinder, revolving upon the ground, through suitable gearing, communicates motion to a spiral blade or cutter, so as to cut the grass against a stationary knife extending from side to side in the frame.

The nature of our invention consists in placing loose collars at each end of this cutter-blade to prevent choking by grass or weeds.

In order to enable others skilled in the art to which our invention appertains to make and use the same, we will now proceed to describe its construction and operation, referring to the annexed drawing, in which—

Figure 1:
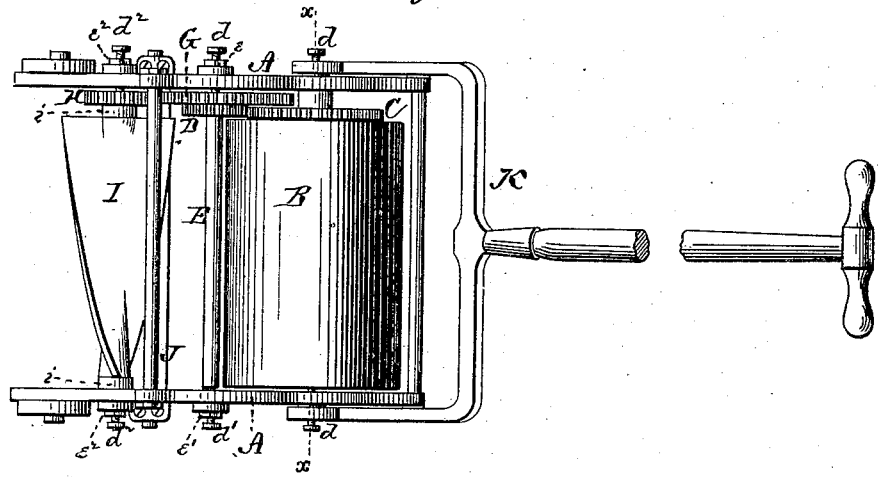
Figure 2:
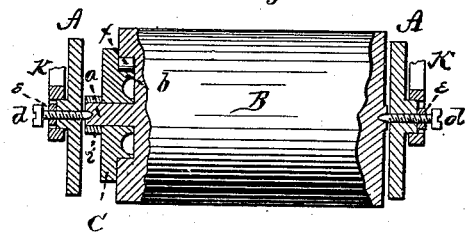

Figure 1 is a plan view of a lawn-mower embracing our invention. Fig. 2 is a longitudinal section of the revolving cylinder.

A represents the frame of the machine. B is the cylinder with cog-wheel C, which gears with a pinion, D, upon the counter-shaft E. G is a cog-wheel upon said counter-shaft, which gears with a cog-wheel, H, upon the shaft or axis of the revolving blade or cutter I. J is the stationary cutter or knife in the front end of the frame A, and K is the handle at the rear end.

These parts may all be constructed in any of the known and usual ways, as we lay no claim to either of them by themselves.

The cylinder B revolves upon the extreme pointed ends of set-screws $d\,d$, passing through the frame A and entering minute conical holes or recesses formed one in the end of the journal $a$, and the other in the center of the opposite end of the cylinder. Jam-nuts $e\,e$ are placed upon the set-screws $d\,d$ to hold them in their proper positions. In like manner the counter-shaft E is revolved upon pointed set-screws $d^1\,d^1$, provided with jam-nuts $e'\,e'$; also the blade or cutter I is revolved upon set-screws $d^2\,d^2$. On either end of the revolving cutter I, upon that portion of the shaft between the cutter-blade and the frame, is placed a loose collar, $i$, which revolves freely and independent of the journal upon coming in contact with grass, weeds, or other obstruction of a like nature, preventing the choking of these parts.

By these means the friction is reduced to the least possible amount, so that the machine can be operated with very little effort and without any evil effects to the operator.

Having thus fully described our invention, what we claim as new, and desire to secure by Letters Patent, is—

The combination, in a lawn-mower, of the cutter-shaft I and frame A, with the loose collar $i$, substantially as and for the purposes set forth.

In testimony that we claim the foregoing as our invention we hereunto affix our signature this 7th day of January, 1874.

ANDREW TURNBULL.
    FRANCIS N. FROST.

Witnesses:
 W. M. CHURCHILL,
 S. H. WOOD.